United States Patent Office 3,474,100
Patented Oct. 21, 1969

---

3,474,100
AMINOTHIOAMIDES
Stephen Sallay, Wynnewood, Pa., assignor to American Home Products Corporation, New York, N.Y., a corporation of Delaware
No Drawing. Filed Feb. 9, 1968, Ser. No. 750,682
Int. Cl. C07c *51/70;* A61k *27/00*
U.S. Cl. 260—268          9 Claims

ABSTRACT OF THE DISCLOSURE

Compounds of the formula:

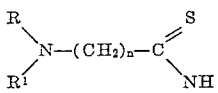

where R, $R^1$ and $n$ are as defined as hereinafter, and the acid addition salts thereof are useful as (1) depressants, that is, they produce a calming effect in the host and (2) as intermediates in the synthesis of N-(9-xanthenyl) aminothioalkanoylamides and N-(9-thioxanthenyl)aminothioalkanoylamides which have pharmacological activity.

---

This application is a continuation-in-part of application Ser. No. 595,603, filed Nov. 21, 1966 now abandoned, by Stephen Sallay and entitled "Aminothioamides."

This invention relates to new and novel aminothioamides which are valuable intermediates in the synthesis of novel N-(9-xanthenyl)-aminothioalkanoylamides and N-(9-thioxanthenyl)aminothioalkanolyamides which have pharmacological activity. The aminothioamides of this invention are active as depressants, that is, they produce a calming effect in the host.

The new and novel compounds of this invention are represented by the following formula:

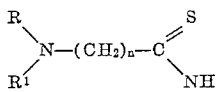

wherein R and $R_1$ when taken separately are both lower alkyl when R and $R_1$ are taken together with the nitrogen atom to which they are attached they form a ring which is 4-(lower)-alkylpiperazino; and $n$ is an integer from 2 to 5, and the acid addition salts thereof. Typical examples of such compounds are: 3 - dimethylaminothiopropionamide hydrochloride; 4 - methylpiperazine-1-thiopropionamide and 2-diisopropylaminothioacetamide.

The new and novel compounds of the present invention may be prepared by the following schematic reaction scheme:

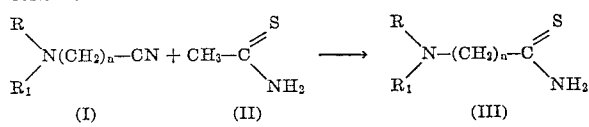

wherein R, $R_1$ and $n$ are defined as above. In pratising the process outlined above, the compounds of this invention are prepared by heating an appropriate aminoalkanonitrile reactant (I) with an excess amount of thioacetamide (II), in dimethylformamide acidified with a mineral acid, e.g. hydrochloric acid, at about steam-bath temperatures for a period of about a half hour.

After the reaction is completed, the mixture is cooled, basified by the addition of an alkali hydroxide, extracted with a water-immiscible solvent, e.g. chloroform and evaporated to dryness. Thereafter, the residue is recrystallized from an appropriate solvent, e.g. ethanol or ethanol-ether to afford the desired aminothioamide (III).

Since many of the amine containing compounds of the present invention are basic, advantage may be taken of the water solubility of salts of these compounds formed with acids in the isolation and/or purification of the above compounds. Particularly effective salts are those formed with pharmaceutically-acceptable acids having a pH value of 3 or lower. Such acids are well-known in the art, for example, hydrochloric, hydrobromic, hydroiodic, sulfuric, nitric, phosphoric, acetic, lactic, citric, tartaric, maleic, gluconic, fumaric, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

Many of the aminoalkanonitrile reactants (I) employed in the process of this invention are known compounds which are readily available from commercial sources while the remainder can easily be prepared in accord with standard procedures well known to those skilled in the art. For example, as shown in Examples I and II, the aminoalkanonitrile reactants may be prepared by the interaction of a secondary amine with an appropriate alkenonitrile at temperatures below 20° C. for a period of about sixteen hours. Thioacetamide (II) is commercially available.

In accord with present invention the aminothioamides (III) herein described have been found to be valuable intermediates in the process for the synthesis of new and novel xanthenyl aminothioalkanoylamides and thioxanthenyl aminothioalkanoylamides which have pharmacological activity and are useful as tranquilizers and anticonvulsants. The process in which the compounds of the present invention are utilized is disclosed in U.S. patent application, Ser. No. 595,602, filed Nov. 21, 1966, and entitled "Xanthene Derivatives."

In the pharmacological evaluation of the central nervous system activity of the compounds of this invention, the in vivo effects are tested as follows:

A compound to be tested is administered intraperitoneally to three mice (14 to 24 grams) at each of the following doses: 400, 127, 40 and 12.7 mg./kg. The animals are watched for a minimum of two hours during which time signs of general depression (i.e., decreased spontaneous motor activity, decreased respiration, ptosis) are noted.

The compounds of the present invention in the above test procedure induce depressant effects at a dose of 127 milligrams per kilogram of host body weight. Ptosis is particularly notable.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, and then dehydrated sufficiently to make it suitable for pressing into a solid form. They may be administered orally in the form of solutions which may contain coloring and flavoring agents or they may be injected parenterally, that is intra-muscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In generally, the compounds of this invention are most desirably administered at a concentration level that will generally afford effective results without causing any harmful or deleterious side effects.

EXAMPLE I

Acrylonitrile is slowly added to an ice cold solution of 54 g. of dimethylamine in 100 ml. of methanol. The addition takes about one hour at a temperature below 20° C. The reaction mixture is stored overnight at room temperature and, thereafter, 3-dimethylaminopropionitrile is removed by distillation at 62–64° C./20 mm. (yield 95 g.).

The above prepared 3-dimethylaminopropionitrile (10.0 g. 0.1 mole) and thioacetamide (15.0 g.; 0.2 mole) are dissolved in 50 cc. dimethylformamide which is saturated with dry hydrochloric acid. The reaction mixture is heated on a steam-bath for one hour. The cooled mixture is poured into a mixture of ice and dilute sodium hydroxide solution and then extracted with chloroform. The residue of the dried chloroform extract is converted into the hydrochloride salt in ether solution and the solid precipitate is recrystallized from ethanol to afford 3-dimethylaminothiopropionamide hydrochloride, M.P 143–144° C.

*Analysis.*—Calcd. for $C_5H_{12}N_2S \cdot HCl$: C, 35.60; H, 7.77; N, 16.60%. Found: C, 35.56; H, 7.94; N, 16.46%.

In a similar manner, 4-diethylaminothiobutyramide hydrochloride and 5-dimethylaminothiovaleramide hydrobromide are produced.

EXAMPLE II

One hundred and nineteen grams (1.2 mole) of N-methylpiperazine are dissolved in 80 ml. of methanol and cooled in an ice-bath. Then 63.6 g. (1.2 mole) of acrylonitrile are added to the solution below 20° C. The reaction mixture is allowed to stand over-night at room temperature and, thereafter, 3-(N-methylpiperazino)-proprionitrile is separated by distillation at 78–80° C./0.3 mm. (yield 163 g. yellow tinted clear liquid).

*Analysis.*—Calcd. for $C_8H_{15}N_3$: C, 62.71; H, 9.87; N, 27.43%. Found: C, 62.44; H, 10.02; N, 26.82%.

The above prepared 3-(N-methylpiperazino)-proprionitrile (15.3 g. 0.1 mole) and 15 g. (0.2 mole) thioacetamide are suspended in 44 ml. saturated dimethylformamide-hydrochloric acid solution and the reaction mixture is heated on a steam-bath for thirty minutes. The resulting red-brown solution is cooled, poured onto ice, diluted sodium hydroxide, and extracted with chloroform. The combined, dried chloroform solution is evaporated to dryness and the 4-methylpiperazine-1-thiopropionamide recrystallized from ethanol-ether, M.P. 132.5–133° C.

*Analysis.*—Calcd. for $C_8H_{17}N_3S$: C, 51.31; H, 9.15; N, 22.44; S, 17.09%. Found: C, 51.54; H, 9.26; N, 22.15; S, 17.06%.

In a similar manner, 4-methylpiperazine-1-(thiobutyramide) is synthesized.

EXAMPLE III

Diisopropylacetonitrile (28 g. 0.2 mole) and 30 g. (0.4 mole) of thioacetamide are suspended in 100 ml. dimethylformamide saturated with hydrochloric acid. The reaction mixture is heated on a steam-bath for one-half hour, cooled and poured onto a 25%, ice-cool sodium hydroxide solution. The alkaline reaction mixture is extracted with chloroform. The residue of the chloroform extract is converted into the hydrochloride salt of 2-diisopropylamino-thioacetamide, M.P. 108.5–110° C. after one recrystallization from ethanol.

*Analysis.*—Calcd. for $C_8H_{18}N_2S \cdot HCl$: C, 45.59; H, 9.08; N, 13.30%. Found: C, 45.58; H, 8.80; N, 13.11%.

In a similar manner, diethylacetonitrile is reacted with thioacetamide to produce 2-diethylaminothioacetamide.

EXAMPLE IV

Dimethylacetonitrile (0.4 mole) and thioacetamide (0.8 mole) are suspended in dimethylformamide saturated with hydrochloric acid. The reaction mixture is heated on a steam bath for thirty minutes, cooled and poured onto a 25%, ice-cool sodium hydroxide solution. The alkaline mixture is extracted wtih chloroform and the chloroform extracts evaporated to dryness to afford 2-dimethylaminothioacetamide.

What is claimed is:

1. A compound selected from the group consisting of those having the formula:

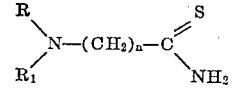

wherein R and $R_1$ when taken separately are both lower alkyl, when R and $R_1$ are taken together with the nitrogen atom to which they are attached they form a ring which is 4-(lower) alkylpiperazino; $n$ is an integer from 2 to 5 and the acid addition salts thereof.

2. A compound as described in claim 1 which is: 3-dimethylaminothiopropionamide hydrochloride.

3. A compound as described in claim 1 which is 4-diethylaminothiobutyramide hydrochloride.

4. A compound as described in claim 1 which is: 5-dimethylaminothiovaleramide hydrobromide.

5. A compound as described in claim 1 which is: 4-methylpiperazine-1-thiopropionamide.

6. A compound as described in claim 1 which is: 2-diisopropylaminothioacetamide.

7. A compound as described in claim 1 which is: 2-diethylaminothioacetamide.

8. A compound as described in claim 1 which is: 4-methylpiperazine-1-thiobutyramide.

9. A compound as described in claim 1 which is: 2-dimethylaminothioacetamide.

References Cited

UNITED STATES PATENTS 3,239,527    3/1966    Schmidt et al. _____ 260—551

ALEX MAZEL, Primary Examiner

A. M. TIGHE, Assistant Examiner

U.S. Cl. X.R.

424—256, 320; 260—327, 465.5, 465.6, 551